Dec. 29, 1970         A. G. BRUN         3,551,005
UNDERWATER CONNECTOR
Filed April 28, 1969
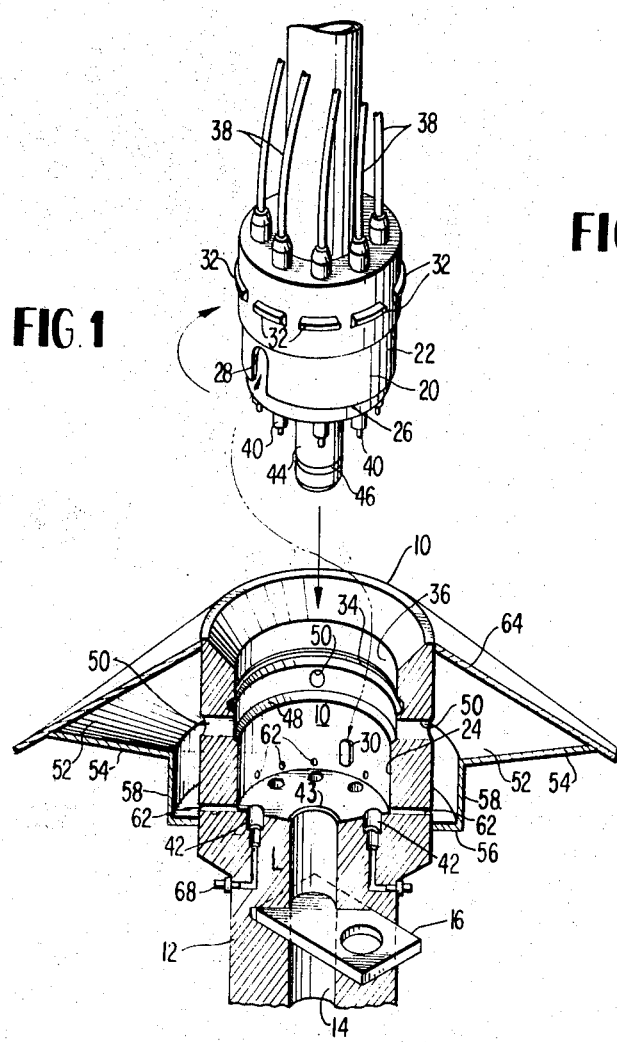
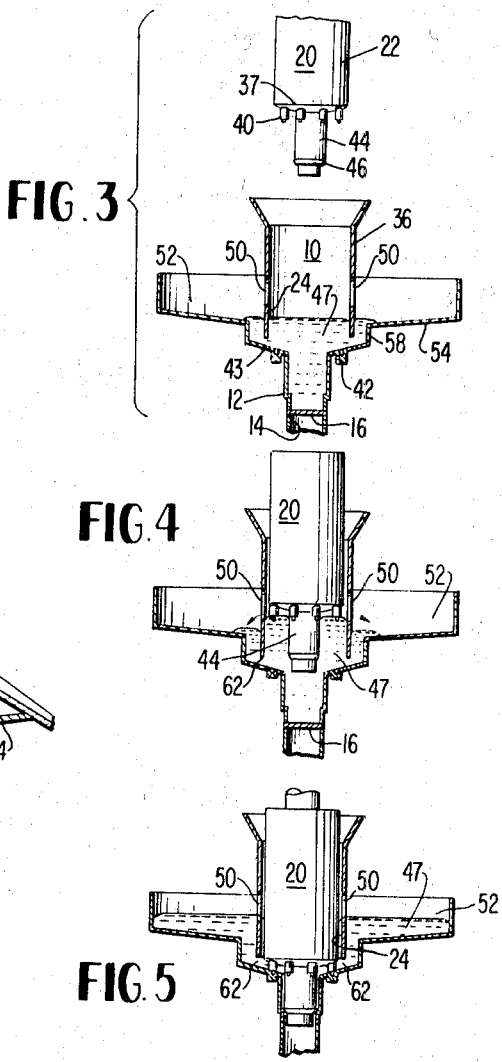
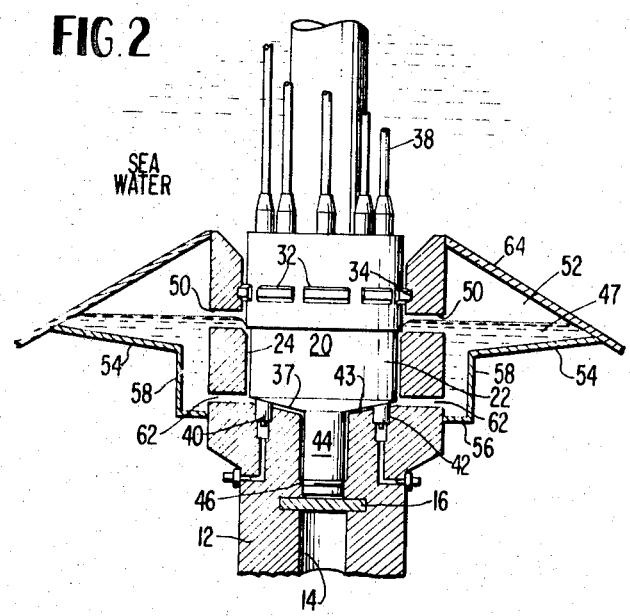
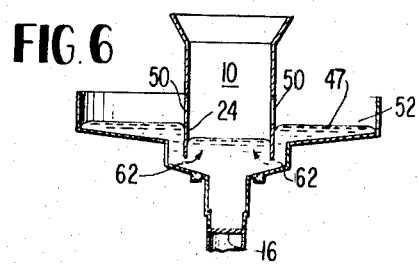
INVENTOR
ANDRÉ G. BRUN
BY
Brady, O'Boyle & Gates
ATTORNEYS

United States Patent Office 3,551,005
Patented Dec. 29, 1970

3,551,005
UNDERWATER CONNECTOR
Andre Georges Brun, Paris, France, assignor to Westinghouse Electric Corporation, Pittsburgh, Pa., a corporation of Pennsylvania
Filed Apr. 28, 1969, Ser. No. 819,774
Int. Cl. F16l 17/00
U.S. Cl. 285—10                                    11 Claims

ABSTRACT OF THE DISCLOSURE

An underwater connector particularly adapted for coupling hydraulic lines from surface equipment to unattended underwater equipment wherein the female member of the connector includes a recess and a mercury pool contained in the recess which covers the mating surfaces which are normally exposed to sea water in absence of a coupyling with the male member of the connector. When a connection is made the male connector member displaces the mercury pool into an overflow chamber on the female member and a clean contact surface is provided in the recess where the coupling is then made. Upon removal of the male connector member from the recess the mercury displaced flows back into the recess through a return passage from the overflow chamber.

CROSS REFERENCE TO RELATED APPLICATION

The present application is related to an application entitled "Underwater Oil and/or Gas Facility" filed by Melvin W. Smith and André G. Brun on Nov. 18, 1968 and having a Ser. No. 776,319. Said related application is also assigned to the assignee of the present invention.

BACKGROUND OF THE PRESENT INVENTION

Field of the invention

The present application discloses a highly reliable means for connecting hydraulic lines to unattended underwater equipment and has particular application for the connection of hydraulic lines to an underwater oil or gas wellhead. In underwater oil facilities such as disclosed in the noted related application, access to the well is made by means of a riser tube connected to a wellhead which is located on or near the ocean floor. The wellhead assembly is enclosed in a suitable manner, but unless the access port located at the top is protected by a removable cap of some type, the precisely machined mating surfaces of the female portion of the hydraulic connector which normally face upwards towards the surface in the case of remote controlled coupling, it is exposed to corrosion by sea water, marine growth or fouling and sedimentation and as a result became pitted, covered with marine encrustations or plugged by seidment.

Description of the prior art

The present method of protection of the subsea wellhead connector is to use a protective cap such as taught by U.S. Pat. 3,050,127 granted to K. W. Foster et al. and U.S. Pat. 3,352,357 granted to W. H. Van Eek. The use of a protective cap requires removal of the cap before making connections and replacement after disconnection. This introduces an undesirable complications not only in the operation itself but in the design of manipulators or other devices which must perform the connection under water. In addition to the above cited patents, another teaching of a cover for the surface casing or drilling mandrel is disclosed in U.S. Pat. No. 3,291,210 issued to R. D. Johnstown et al.

Also the use of mercury as a liquid barrier is generally known. For example, a mercury stuffing box bearing unit suitable for submerged use is disclosed in U.S. Pat. 2,462,901 granted to G. H. Robison. The use of mercury as a liquid seal between sea water and metal parts of a swivel joint for the prevention of electrolytic corrosion is disclosed in U.S. Pat. 3,311,142 issued to E.V. Bergstrom.

While the referenced prior art patents disclose apparatus which operates for the purposes intended, the subject invention is directed to a new use of mercury as a liquid barrier in combination with an underwater connector for hydraulic lines such as those used for an unmanned submerged oil or gas wellhead.

SUMMARY

Briefly the subject invention comprises an underwater connector having a male and female member adapted to be disposed in a substantially vertical position and wherein said female connector member includes a recess for mating with said male member, said recess additionally including a static pool of mercury of a predetermined height when said female member is disconnected from said male member, said recess being coupled to an external chamber or reservoir for mercury by means of at least one opening from said recess to said reservoir with said one opening being located just above the surface of the mercury pool and at least one other opening from said recess to said reservoir beneath the surface of the pool of mercury near the bottom thereof so that the mercury in the pool is displaced by the male connector member which then overflows into the chamber or reservoir through said at least one opening. When said male connector member is disconnected from said female member, the mercury returns to said recess through said second opening to reestablish the mercury pool.

BRIEF DESCRIPTION OF THE DRAWINGS

FIG. 1 is a perspective view partially in cross section of an oil or gas wellhead connector including a male and female member illustrative of the preferred embodiment of the subject invention.

FIG. 2 is a front elevational view partially in cross section of a male and female wellhead connector coupled together and being further illustrative of the preferred embodiment of the subject invention; and FIGS. 3, 4, 5 and 6 are schematic representations of the operation of the subject invention.

DESCRIPTION IF THE PREFERRED EMBODIMENT

Referring now ot the drawings wherein like numbers refer to like parts, FIG. 1 discloses a female underwater wellhead connector member 10 being attached to the upper terminal end of a oil or gas well conductor pipe 12, being axially aligned with the well bore 14 with the flow from the well being controlled by the gate 16 of a swab valve, not shown.

The female connector member 10 is adapted to mate with a male wellhead connector member 20 which is shown comprising a circular housing member 22 which is adapted to fit into the lower recess portion 24 of the female connector member 10. The housing 22 additionally includes a sloping positioning shoulder 26 which terminates in a slot 28 which is adapted to register with a positioning finger 30, in the recess 24 and which projects therefrom. The housing 22 additionally includes a plurality of retractable dogs 32 which are adapted to engage a connecting groove 34 located in the upper recess portion 36 of the female connector member 10. The dogs 32 are retracted until the male connector member 20 is seated inside of the female connector member 10 at which time the dogs 32 are cammed into position so that the dogs 32 engage the connecting groove 34. This actuation can be achieved by any means desirable such as being actuated by the positioning finger 30.

The male connector member 20 additionally includes a lower tapered mating surface 37. A plurality of hydraulic lines 38 extend through the housing 22 terminating in the male coupling elements 40 extending from the tapered surface 37. The elements 40 are adapted to engage the plurality of female coupling bores 42 located in the matching tapered surface 43 of the female connector member 10. The male connector member 20 is adapted to couple into the well bore 14 by means of the projection element 44 extending into the conductor pipe 12 and forming a seal therewith by means of the packing element 46.

Turning now to the novel feature of the subject invention, the female connector member 10 is adapted to contain a relatively static pool of mercury, shown by reference numeral 47 in FIG. 3, in the lower recess portion 24 up to a level corresponding substantially to the height designated by the beveled edge 48 shown in FIG. 1 at which height a plurality of relatively large passages or ports 50 couple into an adjacent chamber or reservoir 52 which surrounds the female connector member 10. The chamber 52 includes an inclined side member 54 and horizontal and vertical side walls 56 and 58 which extend below the bottom surface 43 of the lower recess portion 24. A plurality of smaller passages or ports 62 connect into the chamber 52 at a level lower than the larger ports 50 and being preferably located at the bottom surface 43 of the recess 24. The outer wall 64 of the chamber 52 is inclined toward the upper end of the female connector member 10 providing a frusto-conical outside surface configuration in accordance with the teaching of the underwater oil and/or gas facility disclosed in the aforementioned related application Ser. No. 776,319.

Referring now to FIG. 2, the embodiment shown in FIG. 1 including the female connector member 10 and the male connector member 20 are now shown in coupled engagement. Additionally, the pool of mercury 47 is shown displaced by the body portion 22 of the male connector member 20 which fits into the lower recess portion 24. With the gate 16 of the swab valve in the closed position as shown in FIGS. 1 and 2 the well bore 14 is shut off from the recess 24. With male connector removed the level of the mercury in the lower recess 24 including the portion of the bore down to the gate 16 as well as the chamber 52 is made to come up to a level just below the upper or relatively larger opening or ports 50. When connection is made, however, the male connector member 20 seats itself within the female connector member 10, whereupon the level of the mercury 47 rises, causing it to spill over into the chamber 52 through the relatively larger ports 50. The advantage of providing the pool of mercury 47 within the lower recess portion 24 of the female connector member 10 is that the necessity for a protective cap is eliminated since the mercury itself covers the mating surface 43 with the male connector member 20 removed. Due to the density of mercury, everything commonly encountered under water will float at the surface of the mercury. Accordingly, sand, gravel, particles of metal, marine growth, shells, barnacles, fish, sedimentation, etc. will be unable to penetrate the mercury 66 and thereby settle on the female connection surfaces.

Since the machined surfaces of the inner recesses e.g. surface 43 of the female connector member 10 including the female coupling bores 42 are no longer in contact with sea water, there is no opportunity for these surfaces to become fouled or corroded except by the mercury itself. However this condition is prevented by the proper choice of material for the connector members.

Moreover, since all the sediment and debris float on the surface of the mercury 66, at the time of the spill over into the chamber 52, these unwanted elements will be prevented from reentering the recess 24 by means of the screening action provided by the smaller openings or ports 62. Also the inclined side 54 will pick up a portion of these elements as the level of the mercury recedes in the chamber 52. Additionally, a supplementary screen or some such other filter, not shown, may be provided when desirable in the chamber 52 at the junction of the walls 54 and 58 to further prevent any unwanted material from dropping down to the level of the smaller openings 62.

The operation of the subject invention is further illustrated in FIGS. 3–6. FIG. 3, for example, discloses the male connector member 20 situated above and disconnected from the female connector member 10. The mercury pool 47 is shown being contained not only in the lower recess 24 including the portion of the well bore to the gate 16, but also partially in the chamber 52. The level of the mercury 66 is just below the relatively larger ports 50. Proceeding now to FIG. 4, the male connector member 20 is shown partially inserted into the mercury pool 47 by means of its projection element 44 which starts to displace the mercury into the chamber or reservoir 52 through the ports 50. Continuing on to FIG. 5, the male connector member 20 is shown in complete coupling with the female connector member 10 such that substantially all the mercury contained in the lower recess 24 has been displaced into the chamber 52 at which time the gate 16 and the valve not shown, for the hydraulic lines 38 and their associated lines 68 through the well head are opened. The openings of these valves will cause a relatively small loss of mercury trapped in the lower recesses of the bores 42 and the separation between the projection 44 and the gate 16. However, it is anticipated that connection and disconnection from the wellhead will be required only after relatively prolonged intervals, such that refilling of the mercury pool 47 will not be required except after a relatively long period of use. Finally, FIG. 6 illustrates the action of the mercury pool 47 upon the removal of the male conector member 20. There the gate 16 is again closed and the mercury pool 47 will again seek its own level within the lower recess 24 and the reservoir 52, but again covering the critical surfaces such as the lower surface 43 within the female connector member 10.

What has been shown and described therefore is an improved underwater connector for hydraulic lines. This concept can be extended to any components which require clean surfaces for hydraulic or mechanical connection and even electrical connections with some additional modification. For these reasons, the present detailed specification is not intended to be considered in a limiting sense but it is to be understood that all equivalents, modifications and alterations coming within the spirit and scope of the present invention are herein meant to be included.

I claim as my invention:

1. In an underwater connector having a male and a female connector member, the improvement comprising:
   a female connector member having a recess portion adapted to receive said male connector member in mating engagement therewith;
   a liquid barrier having a predetermined density and level located in said recess portion, said liquid barrier being displaceable by said male connector member when penetration is made therein; and
   means coupled to said recess portion for accepting and storing said liquid barrier when displaced above said predetermined level and for feeding said liquid barrier back into said recess portion when said male connector member is withdrawn.

2. The invention as defined by claim 1 wherein said predetermined density of said liquid barrier is greater than water.

3. The invention as defined by claim 1 wherein said predetermined density of said liquid barrier is greater than sea water.

4. The invention as defined by claim 3 wherein said predetermined density of said liquid barrier is of a magnitude to prevent penetration therein by solids present in sea water.

5. The invention as defined by claim 1 wherein said liquid barrier is comprised of mercury.

6. The invention as defined by claim 4 wherein said recess portion is oriented in a substantially upright position.

7. The invention as defined by claim 1 wherein said means comprises a chamber located externally with respect to said recess portion and having at least one first opening above said predetermined level and at least one second opening below said predetermined level, both said first and said second opening providing coupling between said chamber and said recess portion.

8. The invention as defined by claim 7 wherein said at least one first opening is substantially larger than said at least one second opening.

9. The invention as defined by claim 8 wherein said at least one second opening is located substantially at the bottom of said recess portion.

10. The invention as defined by claim 6 wherein said means comprises a reservoir surounding the exterior of said recess portion and additionally including a plurality of relatively large holes above said predetermined level for coupling said recess portion to said reservoir, and a second plurality of relatively smaller holes located in the vicinity of the bottom of said recess portion also for coupling said recess portion to said reservoir.

11. The invention as defined by claim 10 wherein said liquid barrier is comprised of mercury.

References Cited

UNITED STATES PATENTS

| | | | |
|---|---|---|---|
| 2,462,901 | 3/1949 | Robinson | 277—126 |
| 3,291,210 | 12/1966 | Johnstone et al. | 166—0.6 |
| 3,311,142 | 3/1967 | Bergstrom | 285—11X |
| 3,352,357 | 11/1967 | Van Eek | 166—0.5 |

DAVE W. AROLA, Primary Examiner

U.S. Cl. X.R.

166—0.5; 277—135; 285—18, 137